United States Patent [19]
Katayama

[11] Patent Number: 5,808,727
[45] Date of Patent: Sep. 15, 1998

[54] VEHICLE OPTICAL RADAR APPARATUS

[75] Inventor: Koji Katayama, Tokyo, Japan

[73] Assignee: Mitsubishi Denki Kabushiki Kaisha, Tokyo, Japan

[21] Appl. No.: 858,895

[22] Filed: May 19, 1997

[30] Foreign Application Priority Data

Oct. 29, 1996 [JP] Japan .................................. 8-286933

[51] Int. Cl.⁶ .............................. G01C 3/08; G01B 11/26
[52] U.S. Cl. ...................................... 356/4.01; 356/141.1
[58] Field of Search ................................ 356/4.01, 5.01, 356/141.1, 152.2

[56] References Cited

U.S. PATENT DOCUMENTS

| 5,455,669 | 10/1995 | Wetteborn | 356/5.01 |
| 5,661,551 | 8/1997 | Yamabuchi | 356/5.01 |
| 5,689,328 | 11/1997 | Katayama | 356/4.01 |
| 5,699,150 | 12/1997 | Katayama | 356/4.01 |

FOREIGN PATENT DOCUMENTS 3-175390  7/1991  Japan .

Primary Examiner—Mark Hellner
Attorney, Agent, or Firm—Sughrue, Mion, Zinn, Macpeak & Seas, PLLC

[57] ABSTRACT

In a vehicle optical radar apparatus according to this invention, assembly properties are improved, limitations on design in mounting the apparatus on a vehicle are canceled, and satisfactory distance measuring performance can be obtained.

In this vehicle optical radar apparatus, a light-emitting element is arranged on one end side of a hollow shaft of a pulse motor. A mirror assembly obtained by integrally molding a light-sending mirror and a light-receiving mirror is fixed to the other end of the hollow shaft. A light-receiving element is arranged at a focus position of the light-receiving mirror. A light-sending beam emitted from a light-emitting element is guided to the light-sending mirror through a light-sending lens and the hollow portion of the hollow shaft to be irradiated outside a case. The light-sending beam reflected by an object is reflected from and focused on the light-receiving mirror and then received by the light-receiving element.

14 Claims, 5 Drawing Sheets

VEHICLE OPTICAL RADAR APPARATUS

BACKGROUND OF THE INVENTION

1. Field of the Invention

The present invention relates to a vehicle optical radar apparatus which irradiates beam light from a light source and receives light reflected from an object to detect the distance to the object and, more particularly, to a vehicle optical radar apparatus for causing beam light from a light source to scan, thereby detecting an object in a wide range.

2. Description of the Related Art

FIG. 5 is a sectional view showing a conventional vehicle optical radar apparatus described in Japanese Unexamined Patent Publication No. 3-175390.

Referring to FIG. 5, a laser diode 1, a photodiode 2, an optical isolator 3, a concave mirror 4, and a pulse motor 5 are stored in spaces partitioned by partition plates 8, 9, and 10 in a case 7, respectively.

The concave mirror 4 is arranged such that a position where the laser diode 1 is arranged is set as a focus position. The concave mirror 4 is attached to the rotating shaft of the pulse motor 5 to make it possible to rotate the concave mirror 4 about the optical axis of the laser diode 1. The optical isolator 3 is obliquely arranged between the laser diode 1 and the concave mirror 4 at a predetermined angle with respect to the optical axis of the laser diode 1. The optical isolator 3 transmits beam light from the laser diode 1 therethrough to guide the beam light to the concave mirror 4, and reflects light reflected from the concave mirror 4 to guide the light to the photodiode 2. A dustproof glass 6 is attached to the case 7 to surround the concave mirror 4 in the rotational circumference direction of the concave mirror 4.

Through holes which transmit beam light therethrough are formed in the partition plates 8, 9, and 10 to perform a detecting operation for an object.

An operation of the conventional vehicle optical radar apparatus will be described below.

A light-sending beam emitted from the laser diode 1 is transmitted through the optical isolator 3 to be guided to the concave mirror 4. The light-sending beam guided to concave mirror 4 is reflected from the concave mirror 4 rotated by the pulse motor 5 to make the beam light almost parallel, and the almost parallel beam light is transmitted through the dustproof glass 6 to be irradiated out of the case 7. The light-sending beam irradiated out of the case 7 is scanned in the rotational circumference direction of the concave mirror 4, and, if an object exists, the beam is reflected from the object. The light obtained by causing the light-sending beam to be reflected from the object reaches the concave mirror 4 through the dustproof glass 6. The light is reflected from and focused on the concave mirror 4 in the direction of the laser diode 1. The reflected light reflected from and focused on the concave mirror 4 is reflected from the optical isolator 3 to be guided to the photodiode 2.

The distance to the object is calculated by an arithmetic processing means (not shown) on the basis of an light-emitting signal from the laser diode 1 and a light-receiving signal from the photodiode 2. The direction of the object is detected on the basis of the relationship between an excitation phase of the pulse motor 5 and a reference position when the reflected light from the object is received by the photodiode 2.

FIG. 6 is a sectional view showing another conventional vehicle optical radar apparatus.

Referring to FIG. 6, a case 12 consisting of a light-transmitting material such as a polycarbonate resin or an acrylic resin is attached to a cover 11 to isolate the interior from the outside. A holder 20 is arranged in the case 12 to vertically partition the space in the case 12. A pulse motor 19 serving as an actuator is constituted to have a rotating shaft 19a which extends to both the sides of the pulse motor 19. The pulse motor 19 is attached to the holder 20 such that both the ends of the rotating shaft 19a extend to the vertical spaces partitioned in the case 12. Substrates 13 and 14 incorporating electric circuits thereon are arranged in the case 12 to interpose the pulse motor 19.

A light-emitting element 15 such as a laser diode is mounted on the substrate 13. A light-sending lens 16 which adjusts the angle of the light-sending beam emitted from the light-emitting element 15 to a predetermined divergent angle is held by a holder 17 and then mounted on the substrate 13. A light-sending mirror 18 is obliquely fixed to one end (opposing the substrate 13) of the rotating shaft 19a of the pulse motor 19 at a predetermined angle with respect to the axial center of the rotating shaft 19a. At this time, the optical axis of the light-emitting element 15 and the axial center of the rotating shaft 19a coincide with each other.

A light-receiving element 24 such as a photodiode for converting received light into an electric signal is mounted on the substrate 14. A holder 21 is fitted on and fixed to the other end (opposing the substrate 14) of the rotating shaft 19a of the pulse motor 19. A light-receiving lens 22 for focusing light reflected from the object on the light-receiving element 24 is attached to the holder 21, and a light-receiving mirror 23 for changing the direction of the light reflected from the light-receiving lens 22 to guide it to the light-receiving element 24 is attached to the holder 21.

Reference numeral 25 denotes a vehicle surface on which the vehicle optical radar apparatus arranged as described above is arranged.

An operation of the conventional vehicle optical radar apparatus will be described below.

When the vehicle optical radar apparatus operates, the pulse motor 19 is driven to synchronously rotate the light-sending mirror 18 and the light-receiving lens 22.

A light-sending beam emitted from the light-emitting element 15 is adjusted by the light-sending lens 16 to have a divergent angle, and is guided to the light-sending mirror 18. The light-sending beam guided to the light-sending mirror 18 is reflected from the light-sending mirror 18 rotated by the pulse motor 19, and is irradiated out of the case 12. The light-sending beam irradiated out of the case 12 is scanned in the rotational circumference direction of the light-sending mirror 18, and, if an object exists, the light-sending beam is reflected from the object.

The light obtained by causing the light-sending beam to be reflected from the object reaches the light-receiving lens 22 through case 12, and focused by the light-receiving lens 22. The light focused by the light-receiving lens 22 is reflected from the light-receiving mirror 23 to be guided to the light-receiving element 24.

The distance to the object is calculated by an arithmetic processing means (not shown) on the basis of an light-emitting signal from the light-emitting element 15 and a light-receiving signal from the light-receiving element 24. The direction of the object is detected on the basis of the relationship between an excitation phase of the pulse motor 19 and a reference position when the reflected light from the object is received by the light-receiving element 24.

At this time, the light-sending beam must be designed to be prevented from interfering the vehicle, the vehicle optical radar apparatus is arranged on the vehicle to project from the vehicle surface 25.

In the conventional vehicle optical radar apparatus shown in FIG. 5, the light-sending beam emitted from the laser diode 1 and the light obtained by causing the light-sending beam to be reflected from the object are irradiated on the outside or received by the photodiode 2 while being transmitted through or reflected from the same optical isolator 3, the concave mirror 4, and the dustproof glass 6. In the process for irradiating the light-sending beam on the outside, only part of the light-sending beam is reflected from or scattered by the optical isolator 3, the concave mirror 4, and the dustproof glass 6. The slight light-sending beam reflected from or scattered by the optical isolator 3, the concave mirror 4, and the dustproof glass 6 is also received by the photodiode 2 together with the light reflected from the object. The slight light-sending beam accounts for a large part of the light received by the photodiode 2. Therefore, the S/N ratio decreases extremely and satisfactory distance measuring performance cannot be obtained.

The conventional vehicle optical radar apparatus shown in FIG. 6, as described above, employs the following structure. That is, a light-sending optical system constituted by the light-emitting element 15, the light-sending lens 16, and the light-sending mirror 18 is arranged on one end side of the pulse motor 19, and a light-receiving optical system constituted by the light-receiving lens 22, the light-receiving mirror 23, and the light-receiving element 24 is arranged on the other end side. In the case 12, the light-sending area of the light-sending beam and the light-receiving area of the reflected light are located to interpose the pulse motor 19 in the axial center direction of the rotating shaft 19a of the pulse motor 19. When the apparatus is mounted on the vehicle, the light-sending beam must be designed to be prevented from interfering the vehicle. For this reason, an amount of projection of the apparatus from the vehicle surface 25 increases to pose a problem on design.

Since the light-sending mirror 18 and the light-receiving mirror 23 are incorporated in the end portions of the rotating shaft 19a of the pulse motor 19 respectively, the light-sending mirror 18 and the light-receiving mirror 23 cannot be easily incorporated such that the light-sending direction of the light-sending beam and the light-receiving direction of the reflected light coincides with each other at high precision. In addition, the optical axis of the light-sending beam obtained by the constituent members of the light source constituted by the light-emitting element 15, the light-sending lens 16 and the holder 17 for holding them cannot easily coincide with the axial center of the rotating shaft 19a for driving the light-sending mirror 18, the processing precision of the parts becomes high, and the assembling properties are degraded.

When the light-sending direction of the light-sending beam and the light-receiving direction of the reflected light are shifted from each other, the reflected light cannot be received. When the optical axis of the light-sending beam does not coincide with the axial center of the rotating shaft 19a, the light-sending beam is scanned in the rotational circumference direction while being displaced in the axial direction of the rotating shaft 19a, satisfactory distance measuring performance cannot be obtained.

SUMMARY OF THE INVENTION

The present invention has been made to solve the above problem, and has as its object to provide a vehicle optical radar apparatus in which assembly properties can be improved, limitations on design for mounting on a vehicle are canceled, and satisfactory distance measuring performance can be obtained.

In order to achieve the above object, according to one aspect of the invention, there is provided a vehicle optical radar apparatus comprising: a light source for emitting a light-sending beam; a light-receiving element for receiving reflection light of a light-sending beam reflected from an object; a light-sending mirror for reflecting the light-sending beam to irradiate the object; a light-receiving mirror for reflecting the reflected light of the light-sending beam from the object to focus the reflected light on the light-receiving element; and an actuator for synchronously and rotatably driving the light-sending mirror and the light-receiving mirror, thereby detecting a distance to the object on the basis of a light-sending signal from the light source and a light-receiving signal from the light-receiving element, wherein the light source is arranged on one end face side of the rotational drive shaft of the actuator, the light-receiving element is arranged on the other end face side of the rotational drive shaft of the actuator, and the light-sending mirror and the light-receiving mirror are arranged on the same end face side of the rotational drive shaft of the actuator.

According to another aspect of the present invention, there is provided a vehicle optical radar apparatus comprising: a light source for emitting a light-sending beam; a light-receiving element for receiving reflection light of a light-sending beam reflected from an object; a light-sending mirror for reflecting the light-sending beam to irradiate the object; a light-receiving mirror for reflecting the reflected light of the light-sending beam from the object to focus the reflected light on the light-receiving element; a circular-cylindrical hollow shaft for synchronously and rotatably driving the light-sending mirror and the light-receiving mirror; an actuator; and a power transmission means for transmitting a rotational torque of the actuator to the rotational shaft, thereby detecting a distance to the object on the basis of a light-sending signal from the light source and a light-receiving signal from the light-receiving element, wherein the light source is arranged on one end face side of the hollow shaft, the light-receiving element is arranged on the other end face side of the hollow shaft, and the light-sending mirror and the light-receiving mirror are arranged on the same end face side of the hollow shaft.

DESCRIPTION OF THE PREFERRED EMBODIMENTS

Embodiment 1

Figure 1:
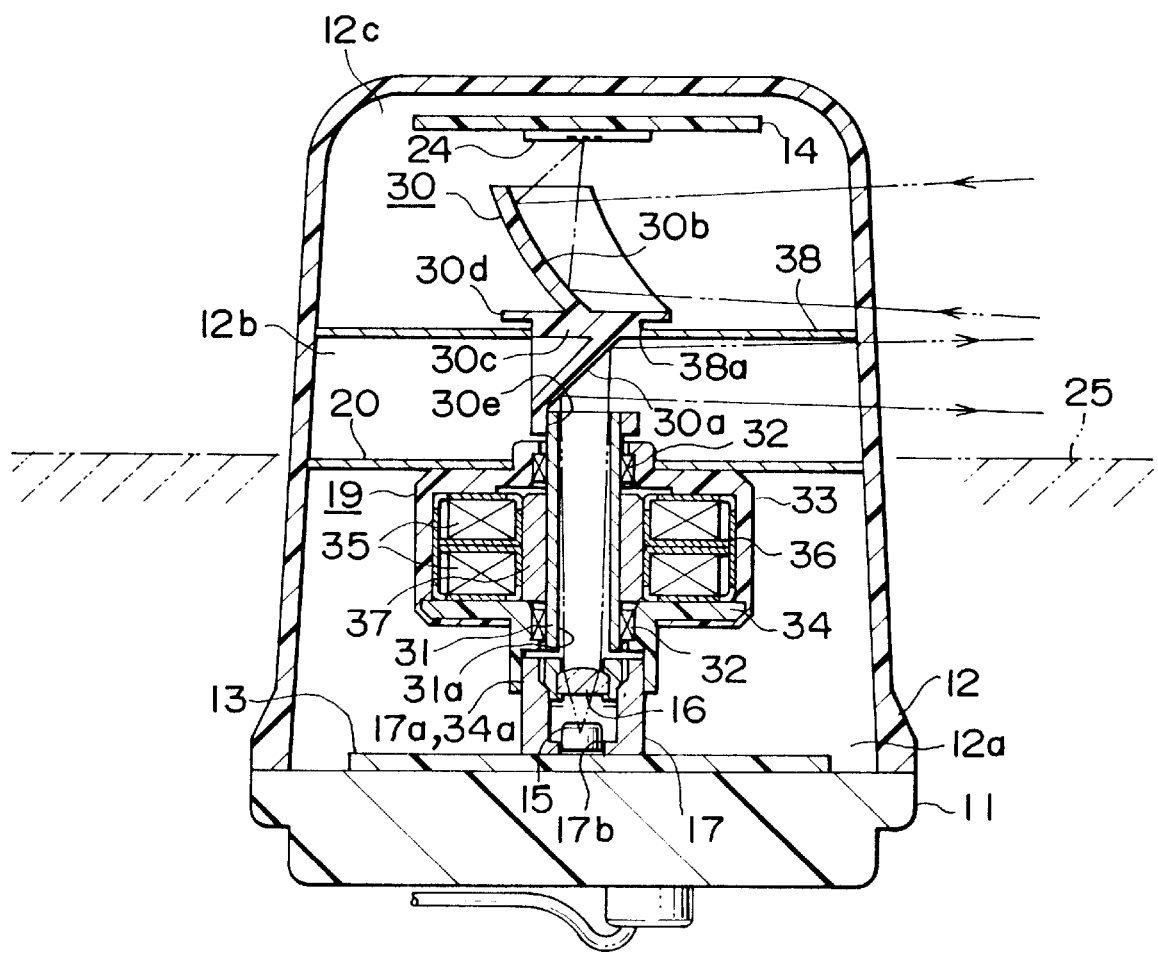
FIG. 1 is a sectional view showing a vehicle optical radar apparatus according to Embodiment 1 of the present invention.
Figure 6:
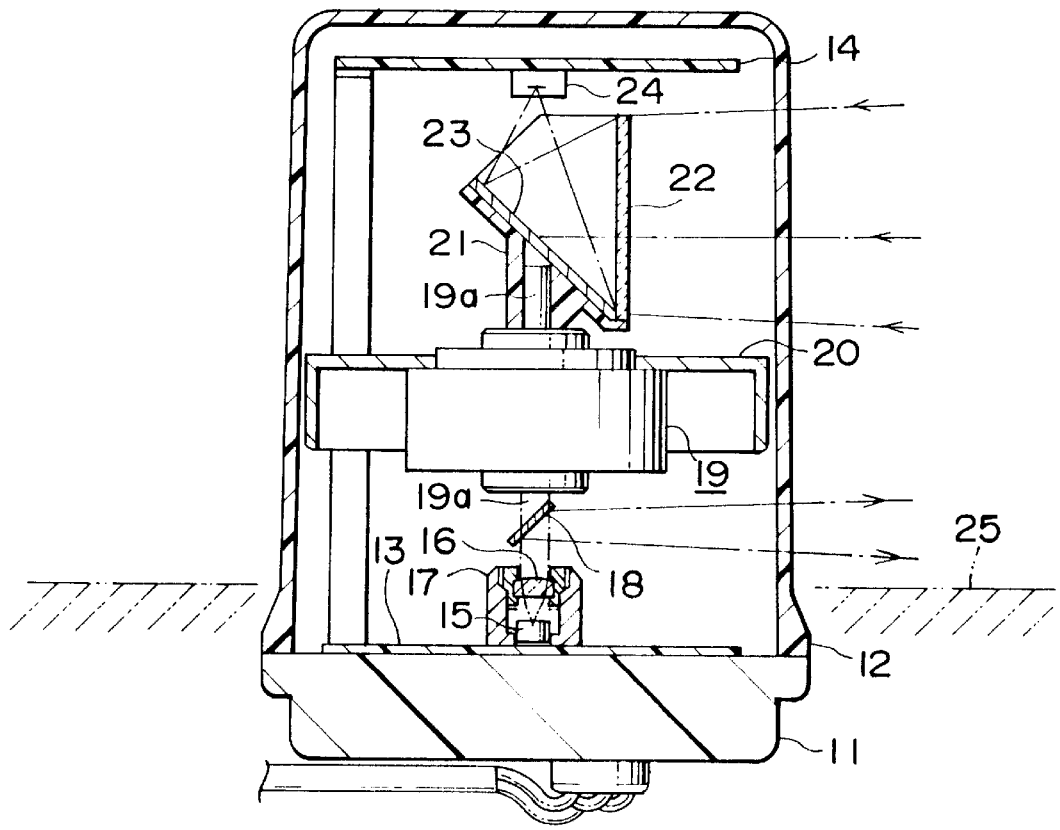
FIG. 6 is a sectional view showing another conventional vehicle optical radar apparatus.

FIG. 1 is a sectional view showing a vehicle optical radar apparatus according to Embodiment 1 of the present invention. The same reference numerals as in the conventional vehicle optical radar apparatus shown in FIG. 6 denote the same parts in FIG. 1, and a description thereof will be omitted.

Referring to FIG. 1, a holder 17 is shaped to have a circular-cylindrical shape with a bottom, and its upper outer peripheral portion constitutes a fitting portion 17a serving as an engagement portion, and a through hole 17b for positioning a light-emitting element 15 with reference to the outer diameter thereof is formed in the bottom portion thereof. This holder 17 is attached to a substrate 13 such that a light-emitting element 15 mounted on the substrate 13 is inserted into the through hole 17b. A light-sending lens 16 is held in the holder 17 with reference to its inner diameter. Here, a light source is constituted by the light-emitting element 15, the light-sending lens 16, and the holder 17, and the optical axis of the light-emitting element 15 is designed to coincide with the central axis of the fitting portion 17a through the center of the light-sending lens 16.

A pulse motor 19 serving as an actuator is constituted as follows. That is, a hollow shaft 31 serving as a rotating drive shaft having a hollow portion 31a is rotatably attached to a housing 33 and a cover 34 serving as holding members through a bearing 32, and a permanent magnet 37 is fixed to the outer periphery of the hollow shaft 31, and a coil 35 and a stator 36 constituting the magnetic pole of the coil 35 are arranged around the permanent magnet 37. This cover 34 has a cylindrical fitting portion 34a which serves as an engaged portion fitted to the fitting portion 17a of the holder 17 and is concentric with the hollow shaft 31.

A mirror assembly 30 is constituted by a light-sending mirror 30a for reflecting a light-sending beam in a predetermined direction, a light-receiving mirror 30b for reflecting and focusing the reflected beam of the light-sending beam from the object on the light-receiving element 24, a shell portion 30c having a circular section and formed in the intermediate portion between the light-sending mirror 30a and the light-receiving mirror 30b integrally therewith, and a flange portion 30d extending in the radial direction over the entire periphery of the shell portion 30c on the light-receiving mirror 30b side of the shell portion 30c. The light-sending mirror 30a has a fitting hole 30e which is formed therein and fitted on the distal end of the hollow shaft 31 projecting from the housing 33. The mirror assembly 30 is constituted as follows. For example, a resin material is shaped into a desired shaped and then applied a reflection coating such as an aluminum coating to a predetermined portion to obtain the light-sending mirror 30a and the light-receiving mirror 30b. Here, the light-sending mirror 30a is formed as a plane mirror having an angle of 45 with respect to the axial center of the hollow shaft 31, and the light-receiving mirror 30b is formed as a concave mirror.

A base 20 and a shielding plate 38 are arranged parallel to each other in the case 12. The interior of the case 12 is partitioned into a first space 12a for storing a pulse motor 19, a second space 12b for storing the light-sending mirror 30a, and a third space 12c for storing a light-receiving mirror 30b.

Here, the mirror assembly 30 is arranged such that a shell portion 30c is loosely fitted in a through hole 38a of the shielding plate 38, the light-sending mirror 30a is located in the second space 12b, and the light-receiving mirror 30b is located in the third space 12c. The flange portion 30d overlaps the shielding plate 38 each other at the outer peripheral portion of the shell portion 30c in the direction of the axial center of the hollow shaft 31. In addition, the light-receiving element 24 mounted on a substrate 14 is arranged at the focus position of the light-receiving mirror 30b.

The pulse motor 19 is fixed to the base 20 such that the housing 33 is inserted into the through hole of the base 20 by pressure and the hollow shaft 31 projects into the second space 12b. The distal end of the hollow shaft 31 projecting in the second space 12b is inserted into the fitting hole 30e of the mirror assembly 30 by pressure, so that the mirror assembly 30 is positioned at and fixed to the hollow shaft 31. The fitting portion 34a formed on the cover 34 is fitted in the fitting portion 17a of the holder 17 to be positioned to the hollow shaft 31 and the light-emitting element 15 mounted on the substrate 13.

In the vehicle optical radar apparatus arranged as described above, the optical axis of the light-emitting element 15 coincides with the axial center of the hollow shaft 31, the light-receiving element 24 is arranged on a line extending along the optical axis of the light-emitting element 15, and the light-sending mirror 30a and the light-receiving mirror 30b are synchronously and rotatably driven by the hollow shaft 31 of the pulse motor 19. The vehicle optical radar apparatus is attached to the vehicle such that the second and third spaces 12b and 12c project from a vehicle surface 25.

An operation of Embodiment 1 will be described below.

When the vehicle optical radar apparatus operates, the pulse motor 19 is driven to rotate the hollow shaft 31. The mirror assembly 30 fixed to the hollow shaft 31 is rotated. More specifically, the light-sending mirror 30a and the light-receiving mirror 30b are synchronously rotated about the axial center of the hollow shaft 31 as a rotational center.

A light-sending beam emitted from the light-emitting element 15 is adjusted by the light-sending lens 16 to have a predetermined divergent angle, and is guided to the light-sending mirror 30a through the hollow portion 31a of the hollow shaft 31. The light-sending beam guided to the light-sending mirror 30a is reflected from the light-sending mirror 30a to be irradiated outside the case 12. The light-sending beam irradiated outside the case 12 is scanned in the rotational circumference direction of the light-sending mirror 30a, and, if an object exists, the light-sending beam is reflected from the object.

The reflected light of the light-sending beam reflected from the object reaches the light-receiving mirror 30b in the third space 12c through the case 12, and is reflected from and focused on the light-receiving mirror 30b to be guided to the light-receiving element 24.

The distance to the object is calculated by an arithmetic processing means (not shown) on the basis of an light-emitting signal from the light-emitting element 15 and a light-receiving signal from the light-receiving element 24. The direction of the object is detected on the basis of the relationship between an excitation phase of the pulse motor 19 and a reference position when the reflected light from the object is received by the light-receiving element 24.

In this manner, according to Embodiment 1, the light source constituted by the light-emitting element 15, the light-sending lens 16, and the holder 17 is arranged on one end face side of the hollow shaft 31 of the pulse motor 19, and the light-receiving element 24 is arranged on the other end face side of the hollow shaft 31, and the light-sending mirror 30a and the light-receiving mirror 30b are arranged on the other end face side of the hollow shaft 31. Therefore, the vehicle optical radar apparatus is preferably mounted on the vehicle so as to project only a portion of the hollow shaft 31 on the other end face side, an amount of projection from the vehicle surface 25 can be decreased, and limitations on design for mounting on the vehicle are canceled.

Since the light-sending mirror 30a and the light-receiving mirror 30b are integrally molded as the mirror assembly 30, the scanning area of the light-sending beam and the light-receiving area can be close to each other in the direction of the axial center of the hollow shaft 31, i.e., the projection direction from the vehicle surface 25, thereby decreasing an amount of projection of the apparatus from the vehicle surface 25. The relative positions between the light-sending mirror 30a and the light-receiving mirror 30b can be assured at high precision, the light-sending direction of the light-sending beam and the light-receiving direction of the reflected light coincide with each other at high precision, so that distance measurement can be performed at high precision. The light-sending mirror 30a and the light-receiving mirror 30b are simultaneously and rotatably driven by only fixing the mirror assembly 30 to the distal end of the hollow shaft 31, so that assembly properties can be improved.

Since the light-sending beam emitted from the light-emitting element 15 through the hollow portion 31a of the hollow shaft 31 is designed to be guided to the light-sending mirror 30a, no special optical system need be used in a transmission system for the light-sending beam emitted from the light-emitting element 15 to the light-sending mirror 30a. The arrangement can be simplified, and improvement on assembly properties and a reduction in cost can be achieved.

The fitting portion 34a formed on the cover 34 for supporting the hollow shaft 31 is fitted on the fitting portion 17a formed on the holder 17, so that the axial center of the hollow shaft 31 serving as the rotational axial center of the light-sending mirror 30a of the mirror assembly 30 coincides with the optical axis of the light-emitting element 15. For this reason, the light-sending beam can be scanned in the rotational circumference direction without being displaced in the direction of the axial center of the hollow shaft 31.

The shielding plate 38 is arranged to partition the interior of the case 12 into the second space 12b and the third space 12c, the shell portion 30c of the mirror assembly 30 is loosely fitted in the through hole 38a of the shielding plate 38, and the flange portion 30d overlaps the shielding plate 38 in the direction of the axial center (direction of thickness of the shielding plate 38) of the hollow shaft 31. Therefore, the light-sending beam reflected or scattered in the second space 12b is blocked from being incident on the third space 12c side by the shielding plate 38 and the flange portion 30d, and is prevented from being received by the light-receiving element 24. As a result, a decrease in S/N ratio can be suppressed, and satisfactory distance measuring performance can be obtained.

Embodiment 2

Figure 2:
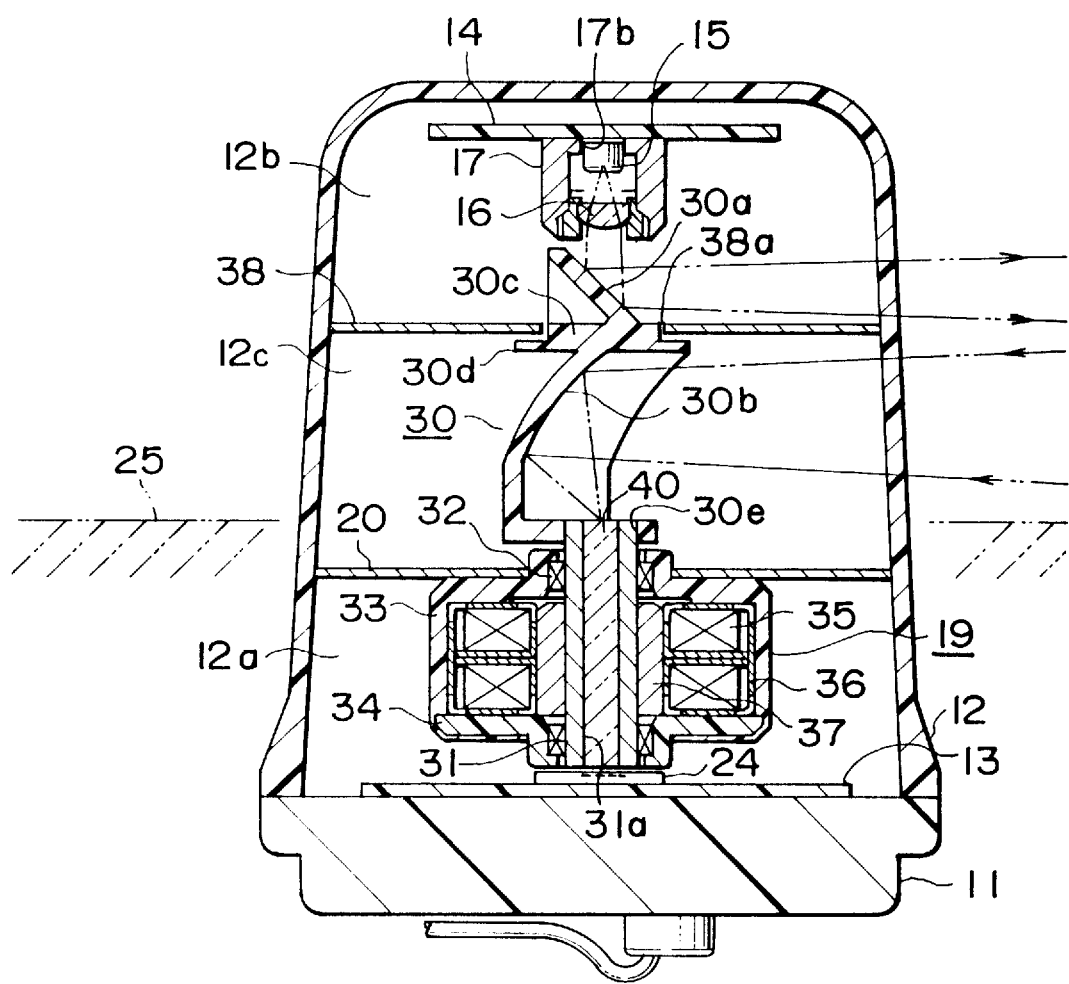
FIG. 2 is a sectional view showing a vehicle optical radar apparatus according to Embodiment 2 of the present invention.

FIG. 2 is a sectional view showing a vehicle optical radar apparatus according to Embodiment 2 of the present invention.

In the mirror assembly 30 according to Embodiment 2, a fitting hole 30e fitted on the distal end of a hollow shaft 31 projecting from a housing 33 is formed in a light-receiving mirror 30b. A base 20 and a shielding plate 38 are arranged parallel to each other in the case 12. The interior of the case 12 is partitioned into a first space 12a for storing a pulse motor 19, a third space 12c for storing the light-receiving mirror 30b, and a second space 12b for storing a light-sending mirror 30a.

The pulse motor 19 is fixed to the base 20 such that the housing 33 is inserted into the through hole of the base 20 by pressure and the hollow shaft 31 projects into the third space 12c. The distal end of the hollow shaft 31 projecting in the third space 12c is inserted into the fitting hole 30e of the mirror assembly 30 by pressure, so that the mirror assembly 30 is positioned at and fixed to the hollow shaft 31. The mirror assembly 30 is arranged such that a shell portion 30c is loosely fitted in a through hole 38a of the shielding plate 38, the light-sending mirror 30a is located in the second space 12b, and the light-receiving mirror 30b is located in the third space 12c. A flange portion 30d overlaps the shielding plate 38 at the outer peripheral portion of the shell portion 30c in the direction of the axial center of the hollow shaft 31.

A light-receiving element 24 is close to the hollow shaft 31 on a substrate 13 attached to a cover 11, and is mounted at the position of the axial center of the hollow shaft 31. A light-emitting element 15 is mounted on a substrate 14 such that the optical axis of the light-emitting element 15 coincides with the axial center of the hollow shaft 31 in the second space 12b partitioned by the shielding plate 38. A light-sending lens 16 is attached to a holder 17 such that the optical axis of the light-emitting element 15 passes through the center of the light-sending lens 16.

A light-guide member 40 consisting of a light-transmitting material such as a polycarbonate resin or glass is filled in a hollow portion 31a of the hollow shaft 31.

An operation of Embodiment 2 described above will be described below.

When the vehicle optical radar apparatus operates, the pulse motor 19 is driven to rotate the hollow shaft 31. The mirror assembly 30 fixed to the hollow shaft 31 is rotated. More specifically, the light-sending mirror 30a and the light-receiving mirror 30b are synchronously rotated about the axial center of the hollow shaft 31 as a rotational center.

A light-sending beam emitted from the light-emitting element 15 is adjusted by the light-sending lens 16 to have a predetermined divergent angle, and is guided to the light-sending mirror 30a. The light-sending beam guided to the light-sending mirror 30a is reflected from the light-sending mirror 30a to be irradiated outside the case 12 through the second space 12b. The light-sending beam irradiated outside the case 12 is scanned in the rotational circumference direction of the light-sending mirror 30a, and, if an object exists, the light-sending beam is reflected from the object.

The reflected light of the light-sending beam reflected from the object reaches the light-receiving mirror 30b in the third space 12c through the case 12, and is reflected from and focused on the light-receiving mirror 30b to be guided to the light-receiving element 24 through the light-guide member 40 filled in the hollow portion 31a of the hollow shaft 31.

The distance to the object is calculated by an arithmetic processing means (not shown) on the basis of an light-emitting signal from the light-emitting element 15 and a light-receiving signal from the light-receiving element 24. The direction of the object is detected on the basis of the relationship between an excitation phase of the pulse motor 19 and a reference position when the reflected light from the object is received by the light-receiving element 24.

As described above, according to Embodiment 2, the same effect as in Embodiment 1 described above can be obtained, reflected light, from the object, reflected from the light-receiving mirror 30b is efficiently received by the light-receiving element 24 through the light-guide member 40, and distance measuring performance can be improved.

Embodiment 3

Figure 3:
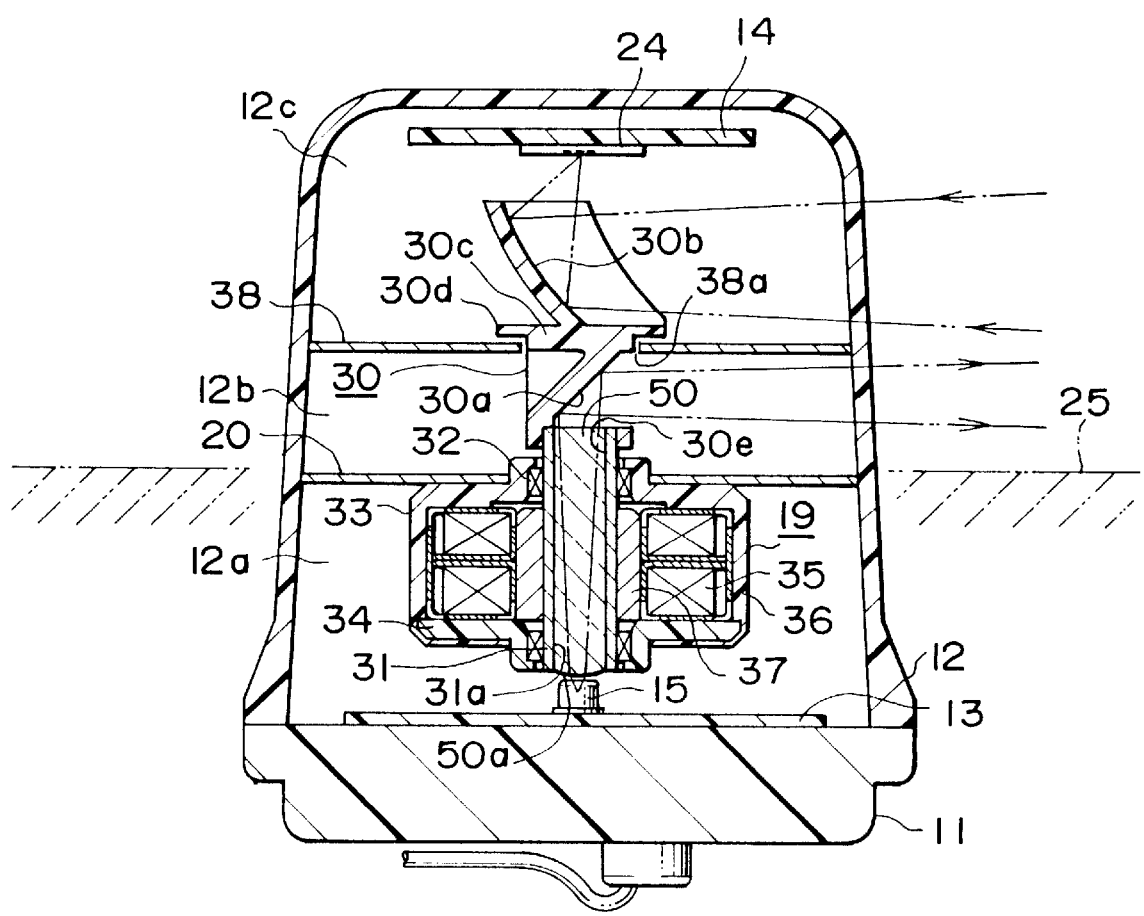
FIG. 3 is a sectional view showing a vehicle optical radar apparatus according to Embodiment 3 of the present invention.

FIG. 3 is a sectional view showing a vehicle optical radar apparatus according to Embodiment 3 of the present invention.

Referring to FIG. 3, a light-guide member 50 consisting of a light-transmitting material such as a glass is filled in a hollow portion 31a of the hollow shaft 31. The distal end face of the light-guide member 50 is shaped to have a projection surface 50a, and a light-emitting element 15 is arranged to be closed to the projection surface 50a of the light-guide member 50 such that the optical axis of the light-emitting element 15 coincides with the axial center of the hollow shaft 31.

The remaining arrangement is the same as that of Embodiment 1 described above.

In Embodiment 3, a light-sending beam emitted from the light-emitting element 15 is adjusted through the light-guide member 50 to have a predetermined divergent angle. The light-sending beam is guided to the light-sending mirror 30a.

Therefore, according to Embodiment 3, the same effect as in Embodiment 1 can be obtained.

The end face of the light-guide member 50 is shaped to have the projection surface 50a, thereby obtaining a lens effect. For this reason, a light-sending lens 16 or a holding member for the light-sending lens 16 is not required, the number of parts constituting the light source can be reduced. Therefore, improvement on assembly properties and a reduction in cost can be achieved.

Embodiment 4

Figure 4:
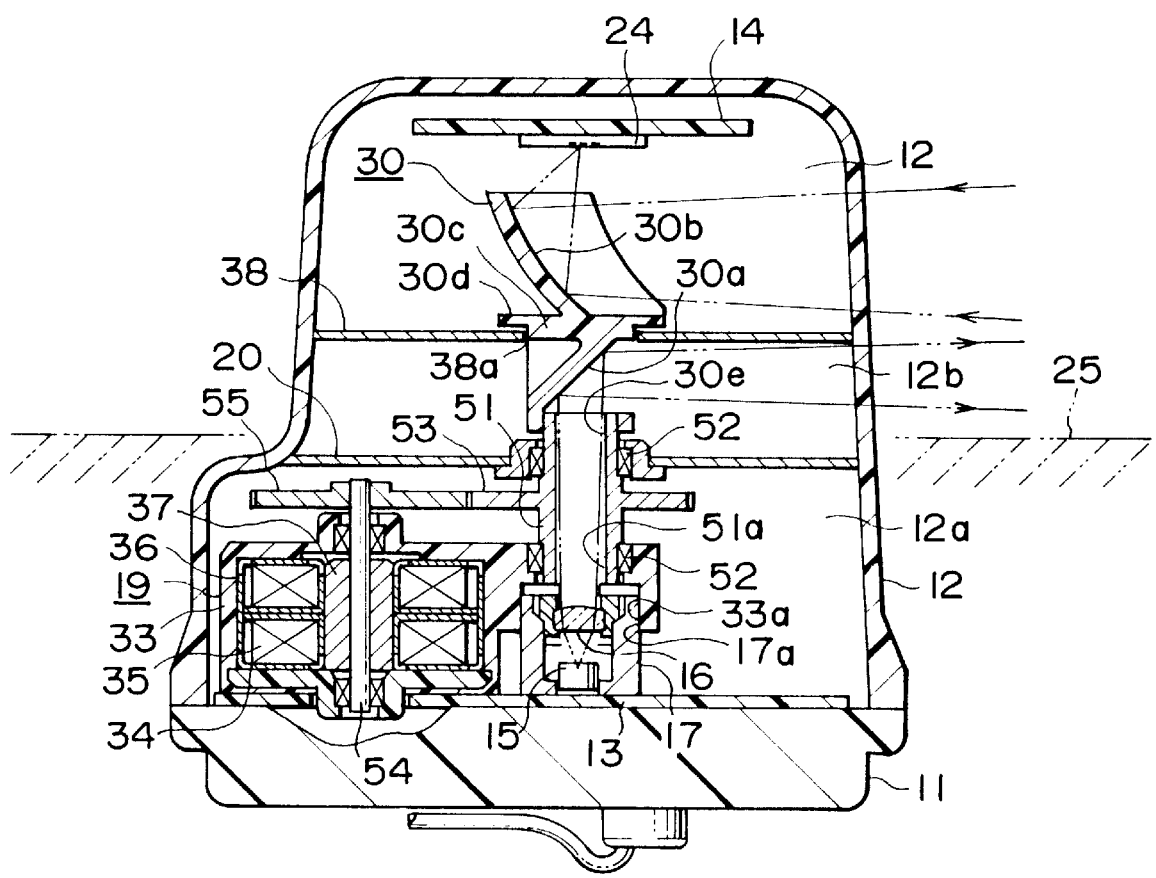
FIG. 4 is a sectional view showing a vehicle optical radar apparatus according to Embodiment 4 of the present invention.
Figure 5:
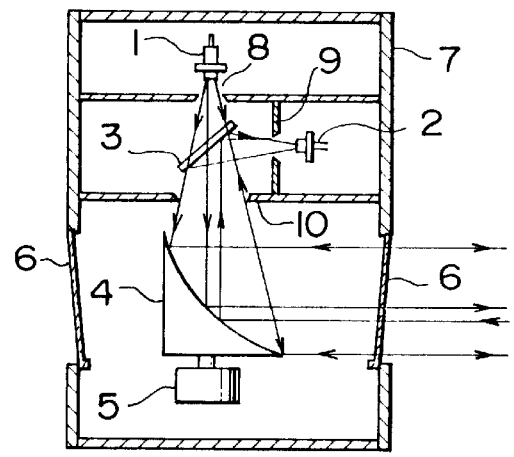
FIG. 5 is a sectional view showing a conventional vehicle optical radar apparatus.

FIG. 4 is a sectional view showing a vehicle optical radar apparatus according to Embodiment 4 of the present invention.

Referring to FIG. 4, a pulse motor 19 is arranged in a first space 12a. A fitting portion 33a serving as an engaged portion is formed in a housing 33 for the pulse motor 19, and a fitting portion 17a of a holder 17 which is a constituent part of the light source is fitted on the fitting portion 33a. A hollow shaft 51 having a circular-cylindrical shape is rotatably attached to a base 20 and the housing 33 through a bearing 52. At this time, the light source and the hollow shaft 51 are positioned through the housing 33 so that the axial center of the hollow shaft 51 coincides with the optical axis of the light-emitting element 15. The fitting hole 30e of the mirror assembly 30 is fitted on the distal end of the hollow shaft 51 projecting from the base 20, and the mirror assembly 30 is positioned and fixed to the hollow shaft 51.

A gear 53 is integrated with the hollow shaft 51, and the gear 53 is meshed with a pinion 55 fixed to the distal end of an output shaft 54 of the pulse motor 19. Here, the gear 53 and the pinion 55 constitute a power transmission means.

The remaining arrangement is the same as in Embodiment 1.

An operation of Embodiment 4 will be described below.

When the vehicle optical radar apparatus operates, the pulse motor 19 is driven to transmit a rotational torque of the pulse motor 19 to the hollow shaft 51 through the output shaft 54, the pinion 55, and the gear 53. The mirror assembly 30 fixed to the hollow shaft 51 is rotated. More specifically, a light-sending mirror 30a and a light-receiving mirror 30b are synchronously rotated about the axial center of the hollow shaft 51 as a rotational center.

A light-sending beam emitted from the light-emitting element 15 is adjusted by a light-sending lens 16 to have a predetermined divergent angle, and is guided to the light-sending mirror 30a through a hollow portion 51a of the hollow shaft 51. The light-sending beam guided to the light-sending mirror 30a is reflected from the light-sending mirror 30a to be irradiated outside the case 12 through a second space 12b. The light-sending beam irradiated outside the case 12 is scanned in the rotational circumference direction of the light-sending mirror 30a, and, if an object exists, the light-sending beam is reflected from the object.

The reflected light of the light-sending beam reflected from the object reaches the light-receiving mirror 30b in a third space 12c through the case 12, and is reflected and focused by the light-receiving mirror 30b to be guided to the light-receiving element 24.

The distance to the object is calculated by an arithmetic processing means (not shown) on the basis of an light-emitting signal from the light-emitting element 15 and a light-receiving signal from the light-receiving element 24. The direction of the object is detected on the basis of the relationship between an excitation phase of the pulse motor 19 and a reference position when the reflected light from the object is received by the light-receiving element 24.

In this manner, according to Embodiment 4, the pulse motor 19 is arranged independently of the hollow shaft 51 for rotationally driving the mirror assembly 30. For this reason, the same effect as in Embodiment 1 described above can be obtained except that the capacity of the first space 12a in Embodiment 4 is larger than that in Embodiment 1.

In Embodiment 4 described above, in the vehicle optical radar apparatus according to Embodiment 1, the pulse motor 19 serving as a driving source is independently of the hollow shaft 51 for rotationally driving the mirror assembly 30. However, the present invention may be applied to not only Embodiment 1 but also another embodiment.

In each embodiment described above, although the case 12 consists of a light-transmitting material, when a visible-ray-cutting material is used as the material of the case 12, external scattering caused by visible rays in distance measurement can be suppressed, and measurement precision can be improved. In addition, when a laser-beam-transmitting material which causes a light-sending beam emitted from the light-emitting element 15 to selectively transmit is used, external scattering in measurement can be reliably suppressed, and measurement precision can be more improved.

In each embodiment described above, a resin mold shaped into a desired shape is applied to reflective coating to integrate the light-sending mirror and the light-receiving mirror with each other. However, a planar reflection mirror and a concave mirror may be incorporated in a resin mold shaped into a desired shape to integrate a light-sending mirror and a light-receiving mirror with each other. Also, a light-sending mirror and a light-receiving mirror may be independently molded and then fixed to each other.

Since this invention is arranged as described above, the following effect can be obtained.

According to the present invention, in a vehicle optical radar apparatus having: a light source for emitting a light-sending beam; a light-receiving element for receiving reflection light of the light-sending beam reflected from an object; a light-sending mirror for reflecting the light-sending beam to irradiate the object; a light-receiving mirror for reflecting the reflected light of the light-sending beam from the object to focus the reflected light on the light-receiving element; and an actuator for synchronously and rotatably driving the light-sending mirror and the light-receiving mirror, thereby detecting a distance to the object on the basis of a light-sending signal from the light source and a light-receiving signal from the light-receiving element, wherein the light source is arranged on one end face side of the rotational drive shaft of the actuator, the light-receiving element is arranged on the other end face side of the rotational drive shaft of the actuator, and the light-sending mirror and the light-receiving mirror are arranged on the same end face side of the rotational drive shaft of the actuator. For this reason, a vehicle optical radar apparatus in which an amount of projection from the vehicle surface in mounting the apparatus on a vehicle can be decreased, and limitations on design can be canceled can be obtained.

The light-sending mirror and the light-receiving mirror are arranged on the other end face side of the rotational drive shaft of the actuator, and the rotational drive shaft of the actuator is constituted by a circular-cylindrical hollow shaft, whereby the light-sending beam emitted from the light source is guided to the light-sending mirror through the hollow portion of the hollow shaft. For this reason, the arrangement of the optical system is simplified, and improvement on assembly properties and a reduction in cost can be obtained.

A light-guide member is filled in the hollow portion of the hollow shaft, and the end face of the light-guide member is formed to have a projection surface, whereby a light-sending beam emitted from the light source is adjusted through the light-guide member to have a predetermined divergence angle, and is guided to the light-sending mirror. For this reason, the number of parts constituting the light source can be reduced, whereby improvement on assembly properties and a reduction in cost can be obtained.

The light-sending mirror and the light-receiving mirror are arranged on one end face side of the rotational drive shaft of the actuator, the rotational drive shaft of the actuator is constituted by the circular-cylindrical hollow shaft, and the light-guide member is filled in the hollow portion of the hollow shaft, whereby reflected light of the light-sending beam from the object is guided to the light-receiving element through the light-guide member. For this reason, the reflected light is efficiently received by the light-receiving element, and distance measuring performance can be improved.

According to the present invention, in a vehicle optical radar apparatus having: a light source for emitting a light-sending beam; a light-receiving element for receiving reflection light of a light-sending beam reflected from an object; a light-sending mirror for reflecting the light-sending beam to irradiate the object; a light-receiving mirror for reflecting the reflected light of the light-sending beam from the object to focus the reflected light on the light-receiving element; a circular-cylindrical shaft for synchronously and rotatably driving the light-sending mirror and the light-receiving mirror; an actuator; and a power transmission means for transmitting a rotational torque of the actuator to the rotational shaft, thereby detecting a distance to the object on the basis of a light-sending signal from the light source and a light-receiving signal from the light-receiving element, wherein the light source is arranged on one end face side of the hollow shaft, the light-receiving element is arranged on the other end face side of the hollow shaft, and the light-sending mirror and the light-receiving mirror are arranged on the same end face side of the hollow shaft. For this reason, a vehicle optical radar apparatus in which an amount of projection from the vehicle surface in mounting the apparatus on a vehicle can be decreased, and limitations on design can be canceled can be obtained.

The light-sending mirror and the light-receiving mirror are arranged on the other end face side of the hollow shaft, whereby the light-sending beam emitted from the light source is guided to the light-sending mirror through the hollow portion of the hollow shaft. For this reason, the arrangement of the optical system is simplified, and improvement on assembly properties and a reduction in cost can be obtained.

A light-guide member is filled in the hollow portion of the hollow shaft, and the end face of the light-guide member is formed to have a projection surface, whereby a light-sending beam emitted from the light source is adjusted through the light-guide member to have a predetermined divergence angle, and is guided to the light-sending mirror. For this reason, the number of parts constituting the light source can be reduced, and improvement on assembly properties and a reduction in cost can be obtained.

The light-sending mirror and the light-receiving mirror are arranged on one end face side of the hollow shaft, and the light-guide member is filled in the hollow portion of the hollow shaft, whereby reflected light of the light-sending beam from the object is guided to the light-receiving element through the light-guide member. For this reason, the reflected light is efficiently received by the light-receiving element, and distance measuring performance can be improved.

An engagement portion is formed in a constituent member of the light source, an engaged portion is formed in a holding member to hold the hollow shaft, and the engagement portion is engaged with the engaged portion, whereby the optical axis of the light-sending beam emitted from the light source is made coincide with the axial center of the hollow shaft. For this reason, assembly properties can be improved, the light-sending beam can be scanned in a rotational circumference direction without displace the light-sending beam in the direction of the axial center of the hollow shaft, and the distance can be stably measured.

Since the light-sending mirror and the light-receiving mirror are integrally molded, assembly properties can be improved. Further, the relative positional relationship between the light-sending mirror and the light-receiving mirror can be assured at high precision, the light-sending direction of the and the light-receiving direction of the reflected light can be made coincide with each other at high precision, and the distance can be measured at high precision. The scanning area of the light-sending beam can be close to the light-receiving area of the reflected light, whereby an amount of projection from the vehicle surface can be reduced.

A shielding plate is arranged such that an intermediate portion between the light-sending mirror and the light-receiving mirror is loosely fitted to partition a portion on the light-sending mirror side and a portion on the light-receiving mirror side, and a flange portion which overlaps the shielding plate in the direction of the thickness of the shielding plate is formed around the intermediate portion, whereby light is prevented by the shielding plate and the flange portion from leaking from the light-sending mirror side to the light-receiving mirror side. For this reason, a decrease in S/N ratio can be suppressed, and distance measuring performance can be improved.

What is claimed is:

1. A vehicle optical radar apparatus comprising: a light source for emitting a light-sending beam; a light-receiving element for receiving reflection light of the light-sending beam reflected from an object; a light-sending mirror for reflecting the light-sending beam to irradiate the object; a light-receiving mirror for reflecting the reflected light of the light-sending beam from the object to focus the reflected light on said light-receiving element; and an actuator for synchronously and rotatably driving said light-sending mirror and said light-receiving mirror, thereby detecting a distance to the object on the basis of a light-sending signal from said light source and a light-receiving signal from said light-receiving element, wherein said light source is arranged on one end face side of said rotational drive shaft of said actuator, said light-receiving element is arranged on the other end face side of said rotational drive shaft of said actuator, and said light-sending mirror and said light-receiving mirror are arranged on the same end face side of said rotational drive shaft of said actuator.

2. A vehicle optical radar apparatus according to claim 1, wherein said light-sending mirror and said light-receiving mirror are arranged on the other end face side of said rotational drive shaft of said actuator, and said rotational drive shaft of said actuator is constituted by a circular-cylindrical hollow shaft, whereby the light-sending beam emitted from light said light source is guided to said light-sending mirror through said hollow portion of said hollow shaft.

3. A vehicle optical radar apparatus according to claim 2, wherein a light-guide member is filled in said hollow portion of said hollow shaft, and the end face of said light-guide member is formed to have a projection surface, whereby a light-sending beam emitted from said light source is adjusted through said light-guide member to have a predetermined divergence angle, and is guided to said light-sending mirror.

4. A vehicle optical radar apparatus according to claim 2, wherein an engagement portion is formed in a constituent member of said light source, an engaged portion is formed in a holding member to hold said hollow shaft, and said engagement portion is engaged with said engaged portion, whereby the optical axis of the light-sending beam emitted from said light source is made coincide with the axial center of said hollow shaft.

5. A vehicle optical radar apparatus according to claim 1, wherein said light-sending mirror and said light-receiving mirror are arranged on one end face side of said rotational drive shaft of said actuator, said rotational drive shaft of said actuator is constituted by a circular-cylindrical hollow shaft, and a light-guide member is filled in said hollow portion of said hollow shaft, whereby reflected light of the light-sending beam from the object is guided to said light-receiving element through said light-guide member.

6. A vehicle optical radar apparatus according to claim 1, wherein said light-sending mirror and said light-receiving mirror are integrally molded.

7. A vehicle optical radar apparatus according to claim 6, wherein a shielding plate is arranged such that an intermediate portion between said light-sending mirror and said light-receiving mirror is loosely fitted to partition a portion on the light-sending mirror side and a portion on the light-receiving mirror side, and a flange portion which overlaps said shielding plate in the direction of the thickness of said shielding plate is formed around said intermediate portion, whereby light is prevented by said shielding plate and said flange portion from leaking from the light-sending mirror side to the light-receiving mirror side.

8. A vehicle optical radar apparatus comprising: a light source for emitting a light-sending beam; a light-receiving element for receiving reflection light of a light-sending beam reflected from an object; a light-sending mirror for reflecting the light-sending beam to irradiate the object; a light-receiving mirror for reflecting the reflected light of the light-sending beam from the object to focus the reflected light on said light-receiving element; a circular-cylindrical hollow shaft for synchronously and rotatably driving said light-sending mirror and said light-receiving mirror; an actuator; and a power transmission means for transmitting a rotational torque of said actuator to said rotational shaft, thereby detecting a distance to the object on the basis of a light-sending signal from the light source and a light-receiving signal from said light-receiving element, wherein said light source is arranged on one end face side of said hollow shaft, said light-receiving element is arranged on the other end face side of said hollow shaft, and said light-sending mirror and said light-receiving mirror are arranged on the same end face side of said hollow shaft.

9. A vehicle optical radar apparatus according to claim 8, wherein said light-sending mirror and said light-receiving mirror are arranged on the other end face side of said hollow shaft, whereby the light-sending beam emitted from said light source is guided to said light-sending mirror through said hollow portion of said hollow shaft.

10. A vehicle optical radar apparatus according to claim 9, wherein a light-guide member is filled in said hollow portion of said hollow shaft, and the end face of said light-guide member is formed to have a projection surface, whereby a light-sending beam emitted from said light source is adjusted through said light-guide member to have a predetermined divergence angle, and is guided to said light-sending mirror.

11. A vehicle optical radar apparatus according to claim 8, wherein said light-sending mirror and said light-receiving mirror are arranged on one end face side of said hollow shaft, and said light-guide member is filled in said hollow portion of said hollow shaft, whereby reflected light of the light-sending beam from the object is guided to said light-receiving element through said light-guide member.

12. A vehicle optical radar apparatus according to claim 9, wherein an engagement portion is formed in a constituent member of said light source, an engaged portion is formed in a holding member for said hollow shaft, and said engagement portion is engaged with said engaged portion, whereby the optical axis of the light-sending beam emitted from said light source is made coincide with the axial center of said hollow shaft.

13. A vehicle optical radar apparatus according to claim 8, wherein said light-sending mirror and said light-receiving mirror are integrally molded.

14. A vehicle optical radar apparatus according to claim 13, wherein a shielding plate is arranged such that an intermediate portion between said light-sending mirror and said light-receiving mirror is loosely fitted to partition a portion on the light-sending mirror side and a portion on the light-receiving mirror side, and a flange portion which overlaps said shielding plate in the direction of the thickness of said shielding plate is formed around said intermediate portion, whereby light can be prevented by said shielding plate and said flange portion from leaking from the light-sending mirror side to the light-receiving mirror side.

* * * * *

UNITED STATES PATENT AND TRADEMARK OFFICE
CERTIFICATE OF CORRECTION

PATENT NO. : 5,808,727　　　　　　　　　Page 1 of 4
DATED　　　 : September 15, 1998
INVENTOR(S) : Katayama, Koji It is certified that error appears in the above-indentified patent and that said Letters Patent is hereby corrected as shown below:

In Claim 1,　line 8, after "actuator" insert --comprising a rotational drive shaft--;
　　　　　　line 11, replace "on the basis of" with --based on--;
　　　　　　line 14, replace "arranged on one" with --disposed at a first--;
　　　　　　line 16, replace "arranged on the other" with --disposed at a second--;
　　　　　　line 19, replace "arranged on the" with --disposed at a--.

In Claim 2,　line 3, replace "arranged on the other" with --disposed at the second--;
　　　　　　line 5, replace "is constituted by" with --comprises--;
　　　　　　line 8, replace "a hollow" with --said hollow--.

In Claim 3,　line 2, replace "wherein" with --further comprising--;
　　　　　　line 2, replace "is filled" with --disposed--;
　　　　　　line 3, replace "and" with --wherein--;
　　　　　　line 4, replace "is formed to have" with --forms--.

In Claim 4,　line 2, replace "wherein" with --further comprising:--;
　　　　　　line 2, delete "is";
　　　　　　lines 2-3, delete "a constituent member of";
　　　　　　line 3, replace "," with --; and--;
　　　　　　line 3, delete --is--;
　　　　　　line 4, replace "and" with --wherein--;
　　　　　　line 7, replace "made coicide with the" with --coincident with an--.

In Claim 5,　line 3, replace "arranged on one" with --disposed at the first--.
　　　　　　line 5, replace "is constituted by" with --comprises--;
　　　　　　line 6, replace "filled in said" with disposed in a--;

UNITED STATES PATENT AND TRADEMARK OFFICE
CERTIFICATE OF CORRECTION

PATENT NO. : 5,808,727
DATED : September 15, 1998
INVENTOR(S) : Katayama, Koji

It is certified that error appears in the above-indentified patent and that said Letters Patent is hereby corrected as shown below:

In Claim 7, line 2, replace "wherein" with --further comprising--;
line 2, replace "is arranged such that" with --comprising--;
line 3, after "portion" insert --interposed--;
line 4, replace "is" with --and--;
lines 4-5, delete "portion on the";
line 5, delete "portion on the";
line 6, replace "," with --;--;
lines 6-7, replace "which overlaps" with --formed around said intermediate portion and overlapping--;
lines 7-9, replace "thickness of said shielding plate is formed around intermediate portion" with --axial center of said hollow shaft--.

In Claim 8, lines 12-13, replace ", thereby detecting" with --to detect--;
line 16, replace " arranged on one" with --disposed on a first--;
line 18, replace "arranged on the other" with --disposed on a second--;
line 20, replace "arranged on the" with --disposed on a--.

In Claim 9, line 3, replace "arranged on the other" with --disposed at the second--;
line 6, replace "said" (first occurrence) with --a--.

In Claim 10, line 2, replace "wherein" with --further comprising--;
line 2, replace "is filled" with --disposed--;
line 3, replace "and the" with --wherein an--;
line 4, replace "is formed to have" with --forms--.

UNITED STATES PATENT AND TRADEMARK OFFICE
CERTIFICATE OF CORRECTION

PATENT NO. : 5,808,727
DATED : September 15, 1998
INVENTOR(S) : Katayama, Koji

It is certified that error appears in the above-indentified patent and that said Letters Patent is hereby corrected as shown below:

In Claim 11, line 3, replace "arranged on one" with --disposed at the first--;
line 4, replace "filled" with --disposed--.

In Claim 12, line 2, replace "wherein" with --further comprising--;
lines 2-3, replace "is formed in a constituent member of" with --formed in--;
line 3, replace "," with --; and--;
line 4, replace "and" with --wherein--;
line 7, replace "made coincide with the" with --coincident with an--.

In Claim 14, line 2, replace "wherein" with --further comprising--;
line 2, replace "is arranged such that" with --comprising--;
line 3, after "portion" insert --interposed--;
line 4, replace "is" with --and--;
line 5, delete "portion on the" (both occurrences);
line 6, replace "," with --;--;
lines 6-7, replace "which overlaps" with --formed around said intermediate

UNITED STATES PATENT AND TRADEMARK OFFICE
CERTIFICATE OF CORRECTION

PATENT NO. : 5,808,727
DATED : September 15, 1998
INVENTOR(S) : Katayama, Koji

Page 4 of 4

It is certified that error appears in the above-indentified patent and that said Letters Patent is hereby corrected as shown below:

portion and overlapping--;
            lines 7-9, replace "thickness of said shielding plate is formed around said intermediate portion, whereby" with --axial center of said hollow shaft, whereby".

Signed and Sealed this

Twelfth Day of October, 1999

*Attest:*

Q. TODD DICKINSON

*Attesting Officer*      *Acting Commissioner of Patents and Trademarks*